(12) United States Patent
Vantalon et al.

(10) Patent No.: US 10,743,037 B1
(45) Date of Patent: Aug. 11, 2020

(54) METHODS AND APPARATUSES FOR A PRIVATE MEDIA ENGINE

(71) Applicant: Digital Keystone, Inc., Cupertino, CA (US)

(72) Inventors: Luc Vantalon, Sunnyvale, CA (US); Paolo Siccardo, Los Altos, CA (US)

(73) Assignee: DIGITAL KEYSTONE, INC., Cupertino, CA (US)

( * ) Notice: Subject to any disclaimer, the term of this patent is extended or adjusted under 35 U.S.C. 154(b) by 0 days.

(21) Appl. No.: 16/395,032

(22) Filed: Apr. 25, 2019

Related U.S. Application Data

(60) Provisional application No. 62/665,289, filed on May 1, 2018.

(51) Int. Cl.
*H04N 21/231* (2011.01)
*H04N 21/266* (2011.01)

(52) U.S. Cl.
CPC . *H04N 21/23113* (2013.01); *H04N 21/23103* (2013.01); *H04N 21/23106* (2013.01); *H04N 21/23116* (2013.01); *H04N 21/266* (2013.01)

(58) Field of Classification Search
CPC ....... H04N 21/23113; H04N 21/23103; H04N 21/23106; H04N 21/23116; H04N 21/266; H04N 21/278; H04N 21/2353; H04N 21/2351; H04N 21/8352; H04N 21/8402

See application file for complete search history.

(56) References Cited

U.S. PATENT DOCUMENTS

| | | | | |
|---|---|---|---|---|
| 10,158,917 | B1 * | 12/2018 | Logan | H04N 21/812 |
| 2003/0133453 | A1 * | 7/2003 | Makishima | H04L 12/4625 370/395.1 |
| 2015/0350701 | A1 * | 12/2015 | Lemus | H04N 21/23116 725/92 |
| 2016/0360243 | A1 * | 12/2016 | Arbuckle | H04N 21/23116 |
| 2019/0236547 | A1 * | 8/2019 | Huang | H04L 65/403 |

* cited by examiner

*Primary Examiner* — Alexander Gee
(74) *Attorney, Agent, or Firm* — Womble Bond Dickinson (US) LLP

(57) ABSTRACT

Methods and systems for efficient operation of a content origination system that uses private copies of content are described. In one embodiment, a generic media description (e.g. a DASH manifest) is modified by replacing generic media element references in the description (e.g. a URL to a media segment file) with a privatized version of the generic media element reference.

32 Claims, 11 Drawing Sheets

Figure 4:

```xml
<?xml version="1.0" encoding="UTF-8"?>
<MPD
  type="static"
  mediaPresentationDuration="PT1802S"
  xmlns="urn:mpeg:dash:schema:mpd:2015"
  xmlns:ext="urn:comcast:dash:schema:mpd:extension:2014"
  xmlns:scte214="urn:scte:dash:2015"
  profiles="urn:scte:dash:2015#ts"
  maxSegmentDuration="PT2.016S"
  minBufferTime="PT0H0M4S"
  id="7839220038640696163"
>
<!-- Insert period from 2018-03-30T00:30:00 to 2018-03-30T01:00:00 for last sample -->
  <Period id="05IWTL-2018-03-30T00:30:00">
    <AdaptationSet mimeType="video/mp2t" codecs="avc1.640020,mp4a.40.5" contentType="video" id="1">
      <ContentComponent contentType="video" id="101"/>
      <ContentComponent contentType="audio" lang="en" id="104"/>
      <BaseURL>../../../../USERID:SZKFVA-</BaseURL>
      <SegmentTemplate timescale="1000" media="$RepresentationID$-$Time$.ts" startNumber="26262">
        <SegmentTimeline>
          <S t="1522369801752" d="2002" r="899"/>
        </SegmentTimeline>
      </SegmentTemplate>
      <Representation width="512" height="288" codecs="avc1.4d4015,mp4a.40.5" id="9SUBA6-4R1EYB">
        <SubRepresentation codecs="avc1.4d4015" bandwidth="571600" contentComponent="101"/>
        <SubRepresentation codecs="mp4a.40.5" bandwidth="117600" contentComponent="104"/>
      </Representation>
      <Representation width="1280" height="720" codecs="avc1.4d401f,mp4a.40.5" id="9SUBA6-A8CX4R">
        <SubRepresentation codecs="avc1.4d401f" bandwidth="2107200" contentComponent="101"/>
        <SubRepresentation codecs="mp4a.40.5" bandwidth="117600" contentComponent="104"/>
      </Representation>
      <Representation width="1280" height="720" codecs="avc1.640020,mp4a.40.5" id="9SUBA6-DZS8RJ">
        <SubRepresentation codecs="avc1.640020" bandwidth="3718000" contentComponent="101"/>
        <SubRepresentation codecs="mp4a.40.5" bandwidth="117600" contentComponent="104"/>
      </Representation>
      <Representation width="640" height="360" codecs="avc1.4d401e,mp4a.40.5" id="9SUBA6-TQASJM">
        <SubRepresentation codecs="avc1.4d401e" bandwidth="828800" contentComponent="101"/>
        <SubRepresentation codecs="mp4a.40.5" bandwidth="117600" contentComponent="104"/>
      </Representation>
      <AudioChannelConfiguration  schemeIdUri="urn:mpeg:dash:outputChannelPositionList:2012" value="0 1"/>
    </AdaptationSet>
    ...
```

```
#EXTM3U
#EXT-X-VERSION:6
#EXT-X-INDEPENDENT-SEGMENTS
#EXT-X-MEDIA:TYPE=AUDIO,GROUP-ID="5JOFEH",NAME="English(mp4a.
40.5)",LANGUAGE="en",DEFAULT=NO,AUTOSELECT=NO,URI="../../../../__start/1522369800000/__stop/1522371600000/
    __ext/1522450676937-1800000/USERID:SZKFVA-9SUBBA-1R9HU5.m3u8"
#EXT-X-MEDIA:TYPE=AUDIO,GROUP-ID="5JOFEH",NAME="Spanish(mp4a.
40.5)",LANGUAGE="es",DEFAULT=NO,AUTOSELECT=NO,URI="../../../../__start/1522369800000/__stop/1522371600000/
    __ext/1522450676937-1800000/USERID:SZKFVA-9SUBBB-1R9HU5.m3u8"
#EXT-X-MEDIA:TYPE=AUDIO,GROUP-
ID="5JOFEH",NAME="English(ac-3)",LANGUAGE="en",DEFAULT=NO,AUTOSELECT=NO,URI="../../../../__start/
1522369800000/__stop/1522371600000/__ext/1522450676937-1800000/USERID:SZKFVA-9SUBBC-15K15K.m3u8"
#EXT-X-MEDIA:TYPE=AUDIO,GROUP-
ID="5JOFEH",NAME="Spanish(ac-3)",LANGUAGE="es",DEFAULT=NO,AUTOSELECT=NO,URI="../../../../__start/
1522369800000/__stop/1522371600000/__ext/1522450676937-1800000/USERID:SZKFVA-9SUBBD-9896C7.m3u8"
#EXT-X-STREAM-INF:BANDWIDTH=689200,RESOLUTION=512x288,CODECS="avc1.4d4015,mp4a.40.5",AUDIO="5JOFEH"
../../../../__start/1522369800000/__stop/1522371600000/__ext/1522450676937-1800000/
USERID:SZKFVA-9SUBA6-4R1EYH.m3u8
#EXT-X-STREAM-INF:BANDWIDTH=2224800,RESOLUTION=1280x720,CODECS="avc1.4d401f,mp4a.40.5",AUDIO="5JOFEH"
../../../../__start/1522369800000/__stop/1522371600000/__ext/1522450676937-1800000/USERID:SZKFVA-9SUBA6-
A6CX4R.m3u8
#EXT-X-STREAM-INF:BANDWIDTH=3835600,RESOLUTION=1280x720,CODECS="avc1.640020,mp4a.40.5",AUDIO="5JOFEH"
../../../../__start/1522369800000/__stop/1522371600000/__ext/1522450676937-1800000/USERID:SZKFVA-9SUBA6-
DZS8RJ.m3u8
#EXT-X-STREAM-INF:BANDWIDTH=946400,RESOLUTION=640x360,CODECS="avc1.4d401e,mp4a.40.5",AUDIO="5JOFEH"
../../../../__start/1522369800000/__stop/1522371600000/__ext/1522450676937-1800000/USERID:SZKFVA-9SUBA6-
TQASJM.m3u8
#EXT-X-I-FRAME-STREAM-INF:BANDWIDTH=313200,RESOLUTION=960x540,CODECS="avc1.4d401f",URI="../../../../
__start/1522369800000/__stop/1522371600000/__ext/1522450676937-1800000/USERID:SZKFVA-9SUCKS-QFYAUG.m3u8"
# Performance 9ms/min [query: 296, proc: 0]
```

502

```
#EXTM3U
#EXT-X-VERSION:6
#EXT-X-INDEPENDENT-SEGMENTS
#EXT-X-TARGETDURATION:3
#EXT-X-PLAYLIST-TYPE:VOD
#EXT-X-MEDIA-SEQUENCE:26262
#EXT-X-KEY:METHOD=NONE
#EXT-X-PROGRAM-DATE-TIME:2018-03-30T00:30:01
#EXTINF:2.002, 26262
../../../../../../USERID:SZKFVA-9SUBA6-4R1EYH-1522369801752.ts
#EXTINF:2.002, 26263
../../../../../../USERID:SZKFVA-9SUBA6-4R1EYH-1522369803754.ts
#EXTINF:2.002, 26264
../../../../../../USERID:SZKFVA-9SUBA6-4R1EYH-1522369805756.ts
...
```

Figure 6:

| | | 346 |
|---|---|---|
| Description | Upon invocation, the servlet registers or unregisters, depending on the do parameter, one replica instance to an event with a time-to-live calculated from the expiration time. | |
| URL | {host}/cts/1.0/apps/replica | |
| Method | GET | |
| Parameter | id | The UTF-8 URL encoded version of the replica base URL, which includes a unique identifier. |
| | exp | The epoch time in millisecond of the expiration time of the replica. A value of 0 means that the replica will not expire. No parameter defaults to system-wide configured value. |
| | do | "register" (default) or "unregister" |
| | rep | A unique identifier of the representation, as use in the media description |
| | url | The UTF-8 URL encoded version of the event URL |
| Request body | none | |
| Response body | none | |
| Returns | 200 (OK)<br>400 (BAD REQUEST) - if the parameters are not compliant<br>504 (SERVER TIMEOUT) - if the C* cluster times out<br>500 (SERVER ERROR) - if the action could not be performed | |

Figure 7:

| Description | Upon invocation, the servlet returns n samples of compliance for the requested event, where each sample covers a period defined as (now - airing time) / n, rounded to an integer number of the 'discovering' interval. | |
|---|---|---|
| URL | {host}/cts/1.0/analytics/comply | |
| Method | GET | |
| Parameter | url | The UTF-8 URL encoded version of the event URL |
| | n | The number of compliance samples between when the event aired and now. |
| Request body | none | |
| Response body | Upon success, returns an xml object compliant with analytics_comply.xsd. | |
| Returns | 200 (OK)<br>400 (BAD REQUEST) - if the parameters are not compliant<br>504 (SERVER TIMEOUT) - if the C* cluster times out<br>500 (SERVER ERROR) - if the action could not be performed | |

Figure 8:

```xml
<?xml version="1.0" encoding="UTF-8"?>
<xs:schema xmlns:xs="http://www.w3.org/2001/XMLSchema">
    <xs:element name="analytics_comply">
        <xs:complexType>
            <xs:sequence>
                <xs:element name="sample" type="Sample-type" maxOccurs="unbounded"/>
            </xs:sequence>
            <xs:attribute name="version" type="xs:string" default="1.0"/>
            <xs:attribute name="url" type="xs:anyURI"/>
        </xs:complexType>
    </xs:element>
    <xs:complexType name="Sample-type">
        <xs:sequence>
            <xs:element name="clientCount" minOccurs="0" maxOccurs="unbounded">
                <xs:complexType>
                    <xs:simpleContent>
                        <xs:extension base="xs:long">
                            <xs:attribute name="repId" type="xs:string"/>
                            <xs:attribute name="avrReplica" type="xs:long"/>
                            <xs:attribute name="maxReplica" type="xs:long"/>
                            <xs:attribute name="minReplica" type="xs:long"/>
                            <xs:attribute name="totalReq" type="xs:long"/>
                            <xs:attribute name="redirect" type="xs:long"/>
                            <xs:attribute name="over" type="xs:long"/>
                            <xs:attribute name="peak" type="xs:long"/>
                        </xs:extension>
                    </xs:simpleContent>
                </xs:complexType>
            </xs:element>
            <xs:element name="startTime_ms" type="xs:long"/>
            <xs:element name="stopTime_ms" type="xs:long"/>
        </xs:sequence>
    </xs:complexType>
</xs:schema>
```

METHODS AND APPARATUSES FOR A PRIVATE MEDIA ENGINE

CROSS-REFERENCE TO RELATED APPLICATIONS

This application claims the benefit of priority to U.S. Provisional Patent Application No. 62/665,289, filed May 1, 2018, which application is hereby incorporated by reference.

FIELD

At least some embodiments as described herein relate generally to the design and operation of an intelligent repository of live media content for the purpose of further high-quality instant redistribution as on-demand assets.

COPYRIGHT NOTICE

The present description includes material protected by copyrights, such as illustrations of graphical user interface images. The owners of the copyrights, including the assignee, hereby reserve their rights, including copyright, in these materials. The copyright owner has no objection to the facsimile reproduction by anyone of the patent document or the patent disclosure, as it appears in the patent and trademark office file or records, but otherwise reserves all copyrights whatsoever. Copyright Digital Keystone, Inc. 2018.

BACKGROUND

The video distribution industry (broadcast TV and Pay TV including satellite TV, cable TV and Telco TV) is actively transitioning from legacy broadcast distribution to Internet (IP-based) streaming delivery of its video assets.

Certain TV network broadcasters, such as CBS and ABC are offering some of their linear channels over IP as a continuous and unique feed using a Linear Origin. Such streaming content can be accessed for playback in real time or near-real time via a PC browser or via TV-specific services such as Apple TV or Roku.

Certain Pay TV service providers such as Comcast or Cablevision are offering subscribers the ability to store and playback on-demand and live content in the network. On-demand content is stored in general-purpose or dedicated servers, while live content is stored in network-based devices (N-DVR), cloud-based devices (C-DVR) or Live On-demand Origins (LOD). All these can be referred to as "Content Origination Systems" (COS). Such Content Origination Systems are hosted in a public or private cloud and provide the subscriber with capabilities similar to an in-home DVR by recording live events for live, near-live or deferred playback.

Content Origination Systems allow for on-demand access to linear (live TV) content. These systems enable the subscriber to catch up with live events (news, sports, weather), at any time, from the beginning of an event, while the event is still airing, or at any time after the event has ended.

Live and on-demand content delivery systems over IP utilize industry standards (such as HLS and DASH—e.g. ISO/IEC 23009-1) to define a media description (i.e. manifests (DASH) or playlist (HLS) depending on the delivery standards). The media description references audio and video media elements (i.e. segments or fragments depending on the delivery standards) and their associated metadata. Event media descriptions may reference one or multiple simultaneous audio and/or video tracks ("representations"), that may represent multiple audio languages, video resolutions, or camera angles.

The most efficient approach to deliver live video on-demand is to record a single copy of each event ("Common Copy") and deliver it to all subscribers. However, due to applicable copyright and broadcasting regulations, certain legal restrictions can mandate that a unique copy of each event ("Private Copy") is assigned to each subscriber. These requirements may be limited to certain content distributors, they may be limited to subscribers located in certain geographic regions and in certain jurisdictions and they may be limited to content copies originated from certain live channels.

The implementation of a COS with "Private Copy" capabilities can be very expensive and cumbersome to implement, because it requires to quickly and efficiently generate, maintain, retrieve and deliver a potentially large number of unique copies of otherwise identical content.

In general, the ability to generate, deliver, monitor and delete content copies must be available regardless of original event airtime and regardless of playback window. As an example, a subscriber may wish to watch an episode of an event that aired live the previous evening (catch-up), while another subscriber may wish to watch an event that started a few minutes ago and is still currently airing (start-over). In both scenarios sufficient individual copies of the event must be generated, delivered, and eventually disposed of with adequate reliability and performance to assure instant and continuous content access, smooth content playback and efficient system operation regardless of the number of channels being recorded, the number and duration of events being published, and the volume of subscribers accessing the content.

The timely availability, delivery and deletion of content copies is essential to the performance, efficiency and regulatory compliance of a COS operating in Private Copy mode. As an example, if an individual copy of an event is not yet available at the time that an individual subscriber requests it, the transaction will fail, and the resulting overall quality of service will be degraded. If at any time the content is delivered from a common copy instead of a unique Private Copy, the transaction will succeed but it will breach the unicity requirement, and the resulting compliance will be degraded. If there are no subscriber requests but the system still maintains multiple copies of an event, the system storage will be higher than required resulting in a cost overrun.

PRIOR ART

Prior Art utilized by TV services and content providers to deliver recorded live content on-demand over IP includes the design and integration into service of a variety of COS systems. Many available COS systems are capable of recording and delivering live content by operating either in Common Copy mode (one copy per event, offered to all subscribers) or in Private Copy mode (one unique copy assigned to each individual subscriber).

A typical COS configured for Private Copy operation includes one or more storage subsystems that record live content for on-demand playback. Regardless of implementation, a COS system that operates in Private Copy mode must a) generate copies, i.e. record a sufficient number of copies of each available event; b) deliver copies, i.e. retrieve an individual copy of the content for each individual subscriber's request; c) monitor copies, i.e. measure the quality, performance and accuracy of the "individual copy" operation to validate compliance with all applicable regulations; and d) delete copies, i.e. eventually dispose of any copies that are no longer required because of content lifecycle such as event availability change or expiration, or because the subscriber has explicitly relinquished its interest to its own copy (i.e. delete).

Existing COS implementations generate copies by recording live content. Each recording can be initiated either on a pre-scheduled basis (popular events are recorded according to an event schedule as available from an Electronic Program Guide), or upon each individual subscriber's explicit request. In general, multiple content copies are recorded on standard or custom storage systems at the time that live content is ingested.

Existing COS implementations deliver copies by relying on a file system or database to retrieve a unique copy of an event out of a large collection of copies. In general, each subscriber request for an event is routed to an individual copy of that event. This applies to requests for event media descriptions, as well as each request for the media elements that are referenced by the event media description.

Existing COS implementations may be able to monitor copies by recording a failure to retrieve an individual copy. Examples of copy failures include retrieving a copy that is allocated to another subscriber or failing to retrieve a copy quickly enough to achieve on-time content delivery.

Existing COS implementations may be able to delete content copies by scanning the copy database or file system for content that is obsolete and deleting it using a standard database or filesystem file removal process.

Several mitigation approaches are utilized by the industry to reduce the cost of operating a true "Private Copy" system, including limiting the time window that applies to a true Private Copy mode, or allowing "de-duplication" to collapse multiple copies to a single copy within certain availability windows.

Prior Art Limitations

The application of COS technology to content distribution in Private Copy mode is subject to various well-known limitations that can affect the functionality, scalability, real-time performance and observability of the system, and as a result can affect the quality of experience of the viewer, the cost of operation, and ultimately the commercial value and viability of the service.

Certain traditional COS systems operating in Private Copy mode attempt to record a private copy of each event for each subscriber. The brute-force approach of translating the reference one terabyte of private content storage typical of an in-home DVR would require a multiple Exabyte (thousands of petabytes) fast storage that does not have any viable cloud implementation. File system and database technologies cannot cope with the expectation to access any one item on the fly out of such a large dataset at the click of a button. The resulting implementations are inefficient and prone to failures, and as a consequence not only performance but also availability and compliance are compromised.

Certain traditional COS systems operating in Private Copy mode bind a complete copy of a recorded event to each subscriber. If the system treats this content as a single continuous event, a private copy of the entire event must be maintained for each subscriber. Even in the case that one subscriber may be watching the beginning of the event, while another subscriber may be watching the end of the same event, the entire event length in each copy is dedicated to each subscriber, thus creating significant storage inefficiencies.

Certain traditional COS systems operating in Private Copy mode attempt to record multiple copies of an event in real time when the event is originally aired. The content ingest process is subject to the constraint of dealing with live encoded content inputs, while the file copy process is based on file system and database technologies that are ill-suited to real-time operation and become slower as the scale of the number of copies is increased. As a result, performance is impaired and optimization at scale is not attainable. Upon playback, the user expects to get their (private) content copy immediately upon request, but as a consequence of the large copy count, the file system takes some time before the individual subscriber copy is retrieved. An additional consequence of slow retrieval is that a large number of content copies ends up being not utilized by any subscriber at all, and their deletion is just as difficult as the retrieval, meaning that the system provides not only a poor quality of experience but also a high operation cost.

Another consequence of performance and reliability limitations of a traditional COS operated in private copy mode is the limited ability to provide timely and accurate metrics of the actual compliance with regulatory requirements. Failures are obviously present in the system, but their precise quantity, cause and resolution remain obscure making it difficult or impossible to provide a reliable audit with any degree of provability.

REFERENCED PATENT

Referenced U.S. Pat. No. 9,819,972 defines a novel Live On Demand (LOD) Origin architecture that enable the provision, operation and management of massively scalable, highly efficient, high availability COS that offer random access to linear feeds without playback restrictions, supporting live, near-live, catch-up, start-over and on-demand access modes regardless of the origin, network and player limitations.

If among others, U.S. Pat. No. 9,819,972 resolves the constraints of the limited storage capacity of other traditional COS implementations by providing means for unbounded scalability, it does not address the delivery of private copy media.

SUMMARY OF THE DESCRIPTION

The subject of embodiments of the invention is methods and apparatuses of a Private Media Engine (PME), for the purpose of extending the role and features of a standard COS implementation to efficiently operate in private copy mode. One or more embodiments of the invention can dynamically optimize replication of the media elements comprising an event, thus reducing the total amount of required storage for the purpose of controlling the cost of operation; can increase the speed and reliability of the responses to unique client device requests for the purpose of enhancing the system performance and the resulting quality of user experience; and at the same time can provide detailed monitoring with the goal to guarantee the desired level of compliance to the applicable copyright laws with a high degree of provability.

BRIEF DESCRIPTION OF DRAWINGS

The embodiments as described herein are illustrated by way of example and not limitation in the figures of the accompanying drawings in which like references indicate similar elements.

FIG. 4 shows an exemplary embodiment of a privatized DASH manifest.

FIG. 5 shows an exemplary embodiment of a privatized HLS main and variant playlist.

FIG. 6 shows an exemplary embodiment of a Replica Web Service.

FIG. 7 shows an exemplary embodiment of a Compliance Web Service.

FIG. 8 shows an exemplary embodiment of an XML Schema Definition that describes the format of the XML object returned by the Compliance Web Service of FIG. 7.

DETAILED DESCRIPTION

The embodiments will be described with references to numerous details set forth below, and the accompanying drawings. The following description and drawings are illustrative of the embodiments and are not to be construed as limiting. Numerous specific details are described to provide a thorough understanding of the embodiments as described herein. However, in certain instances, well known or conventional details are not described in order to not unnecessarily obscure the embodiments in detail.

Reference throughout the specification to "at least some embodiments", "another embodiment", or "an embodiment" means that a particular feature, structure, or characteristic described in connection with the embodiment is included in at least some embodiments as described herein. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Figure 1:
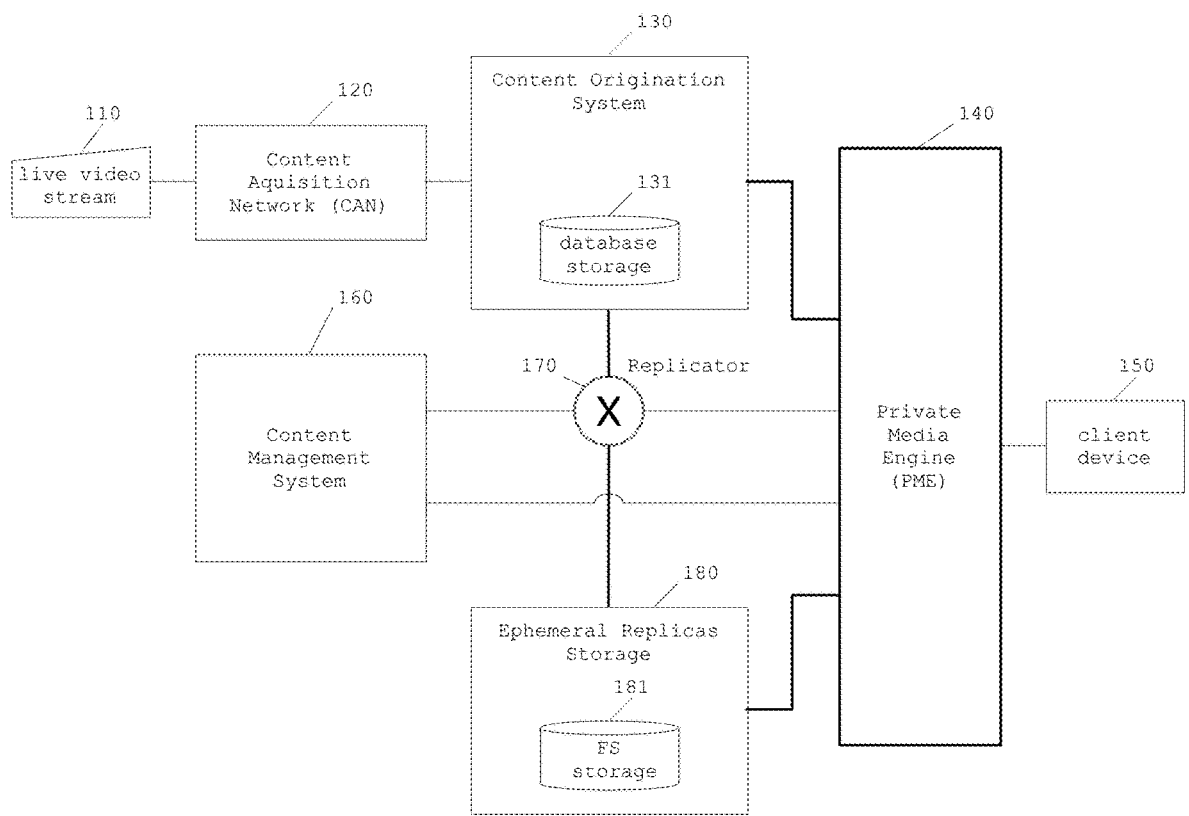
FIG. 1 shows a block diagram illustrating an exemplary embodiment of a PME working in conjunction with a Content Origination System, an Ephemeral Replicas Storage, a Content Management System and a Replicator to provide a true private copy delivery experience to one or more client devices.

FIG. 1 shows a block diagram 100 illustrating an exemplary embodiment of a Private Media Engine 140 connected to a Content Origination System 130, an Ephemeral Replica Storage 180, a Content Management System 160 and a Replicator 170 to provide a private media delivery experience to one or more Client Devices 150. In one embodiment of the invention, the Client Device 150 is associated with a specific user of a TV service (e.g., a known, identified subscriber of Comcast or NetFlix or Hulu, etc., where the subscriber is identified by identification data such as a unique subscriber identifier (ID)).

The origin 130 is recording one or more Live Video Streams 110 through one or more Content Acquisition Networks 120. The Live Video Streams 110 can include one or more events such as TV programs, live sports events, video on demand, news programs, etc., all provided using live streaming through IP (Internet Protocol) using in one embodiment HTTP compliant protocols such as HLS or DASH. The Content Management System 160 is instructing one or more Replicator 170 instances to make or delete copies of the media elements of one or more event representations from the origin 130 to storage 180. In one embodiment of the invention, the instructions from the Content Management System 160 to the replicator instances are modulated by the compliance information delivered by PME 140. In another embodiment of the invention, the copies in storage 180 have an expiration attribute. In another embodiment, the Replicator 170 instances register each successful copy transaction with the PME 140. In one embodiment, the copy transaction registration includes the expiration of the copy. The COS 130 can be implemented using one of the embodiments described in U.S. Pat. No. 9,819,972 which is hereby incorporated herein by reference.

Figure 2:
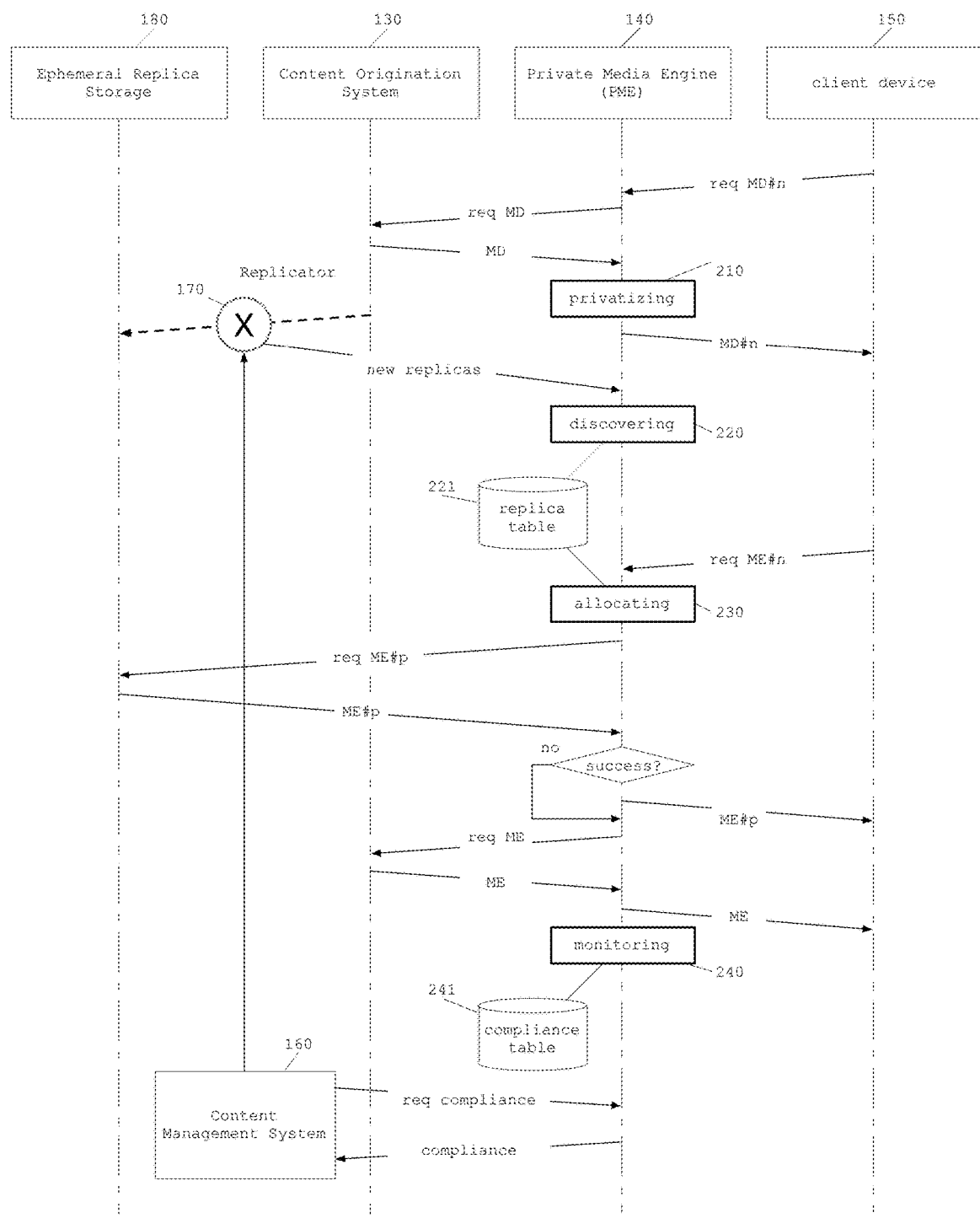
FIG. 2 shows a flowchart of the transactions processed by an exemplary embodiment of a PME.

FIG. 2 details a flowchart 200 of the transactions processed by an exemplary embodiment of PME 140. Upon receiving an identified request from a Client Device 150 of a unique media description (MD # n) of an event for the device, PME 140 requests the generic version of the media description from a Content Origination System 130. Upon reception, PME 140 performs the privatizing 210 of the generic media description (e.g. an HLS playlist or a DASH manifest) and returns the privatized media description (MD # n) (e.g. a privatized HLS playlist or a privatized DASH manifest) to client 150. In one embodiment of the invention, the PME caches the generic media descriptions, so that further requests by other client devices 150 don't require the origin to be queried again. A privatized media description includes, in one embodiment, identified media element references (ME # n) (such as segments of media that are referred to by a URI in an HLS playlist or a DASH manifest) that are unique to the identified request of the Client Device 150. In one embodiment, an identified request from a Client Device 150 contains an identification parameter that identifies the user of that Client Device. In another embodiment, the identification parameter in each media request includes a unique subscriber ID. In another embodiment, the identification parameter in each media request includes a unique Client Device ID that identifies a device which may be owned or used by a user who also is identified by a subscriber ID. The Client Device ID can identify a particular device with a unique device identifier, such as the unique device identifiers in microprocessors or other devices.

In one embodiment, one or more instances of Replicator 170 are making multiple copies of the media elements from origin 130 to the Ephemeral Replica Storage 180 in the background, as instructed by a Content Management System 160. The process of making copies can be highly parallel and asynchronous to the requests from the client devices 150. The PME 140 provides an interface for the Replicator instances 170 to register each copy of an event representation once made available. In one embodiment of the invention, Replicator 170 registers a copy with an expiration; in another embodiment of the invention, PME 140 provides an interface to delete a previously registered copy.

In one embodiment of the invention, the Content Management System 160 instructs the Replicator 170 instances to generate a desired number of copies of all the media elements on a per event representation basis (where a representation is a version of the event in one of the available formats or languages or resolutions or views of the event).

In one embodiment, PME 140 is Discovering 220 (shown in FIG. 2) the number P of copies of media elements (i.e. "replicas") that are available for each event representation, taking into account replicas that have been added, replicas that have expired and replicas that have been deleted. The actual list of available replicas per event per presentation is populated in a Replica Table 221 (shown in FIG. 2). In one embodiment, the Discovering can occur continuously, and the frequency of Discovery can define a compliance interval.

Upon reception of an identified media element request (ME # n) from a client device 150, PME 140 performs the allocating 230 (shown in FIG. 2) of the identified media element request to one chosen replica (ME # p) of the media element, and in turn retrieves the chosen replica of the media element from the Ephemeral Replica Storage 180.

When PME 140 receives a successful response to the media element replica (ME # p) request from storage 180, the media element replica is forwarded to the requesting device 150.

The allocating 230 is based on the number of replicas that are available and not on any other system state or any event parameter. As long as the system assures that an adequate replication level has been achieved for a certain event representation, the allocating will dynamically map unique incoming media element requests against the current pool of available event representation replicas. Thus, the requirement to provide a unique copy for each identified request is achieved by global (event-level) replication and by local (media-element) allocation.

In one embodiment of the invention, the request for media elements that are referenced by two or more overlapping events is made from a pool of the combined available replicas for all the overlapping events. For example, the same media element could be referenced by a first event from 6 PM to 7:05 PM and also be referenced by a second event from 7 PM to 8 PM, if the media element is included in the 7 PM to 7:05 PM interval. In this case, the allocating 230 will select a replica among a pool of replicas that combines replicas of the first event and replicas of the second event. In one embodiment, the allocating transaction will be applied only to the event of the selected replica for compliance reporting purposes.

In one embodiment of the invention in case storage 180 fails to return the requested media element replica or in case the request times out, PME 140 requests the generic version (ME) of the media element from origin 130. In this scenario, the generic media element is returned to the requesting device instead of the allocated replica.

In one embodiment, PME 140 performs the monitoring 240 of all the allocating 230 transactions in the background and records the results in a Compliance Table 241. In one embodiment of the invention, table 241 includes replication, traffic and compliance parameters per sampling interval and per event representation.

PME 140 provides an interface for a Content Management System 170 to retrieve the compliance data per event representation and per any arbitrary analytic interval. As an example, in one embodiment the Content Management System can retrieve compliance data for an event representation, over the first 24 hours since it first aired.

In one embodiment of the invention, the PME provides compliance information to Content Management System 170 to help calculate the appropriate number of event representation replicas. In another embodiment, the content management system increases or decreases the number of desired replicas based on the monitoring of peak unique client requests for media elements and the available number of replicas for the event representation.

In another embodiment, the content management system determines actual event replication compliance, based on allocating transactions, the total fallback transactions and over-allocated transactions.

In one embodiment, the content management system optimizes the desired number of event representation replicas, based on compliance information. In another embodiment, artificial intelligent (AI) functions of Content Management System 170 are used to perform the optimization.

In one embodiment of the invention, the compliance information delivered by PME 140 in Compliance Table 241 defines a proof of compliance.

Figure 3:
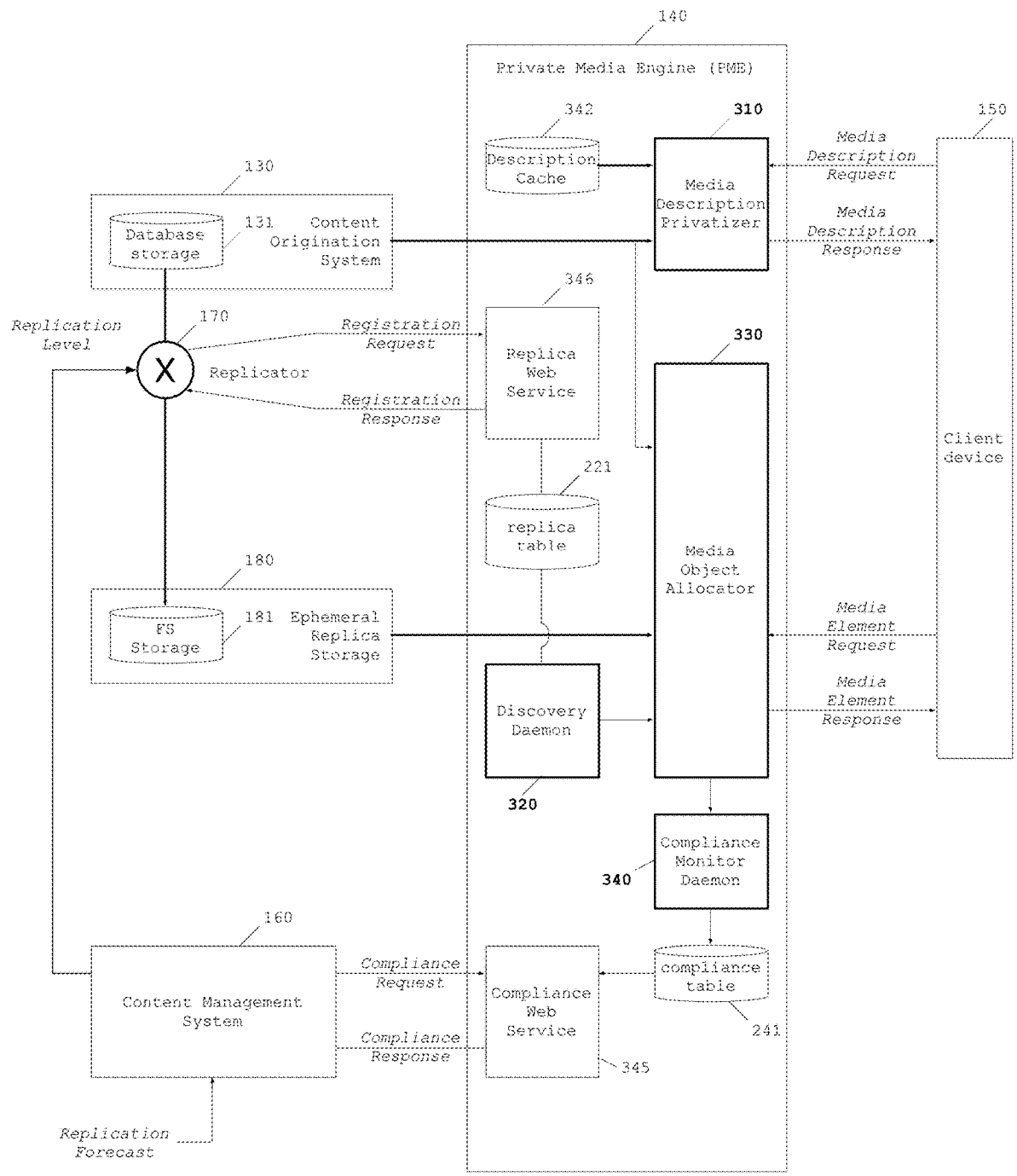
FIG. 3 shows a detailed block description of an embodiment of a PME.

FIG. 3 shows a detailed block description of an embodiment of a PME 140. A Media Description Privatizer 310 is processing identified media description requests from one or more client devices 150. For example, a client device request can specify, as part of a request for an event (e.g. a nightly TV show at 11 p.m. that is a live event) an identifier of the event with an identification parameter; the request can include an identifier of the event and the identification parameter that can be one or more of: a user ID, or subscriber ID, or a client device ID. Upon reception, privatizer 310 checks if a generic description of the event is already in the Description Cache 342. If no generic event description is already available, privatizer 310 queries the Content Origination System 130 for the description and updates the cache 342 with a copy of the generic event description (without any privatization) received from COS 130. Privatizer 310 then post-processes the media description to generate a privatized media description for the event, by inserting an appropriate identification parameter into each of the media element references in the media description. In one embodiment, the Privatizer 310 receives an identified media request from a Client Device that contains a user identification parameter, and it generates a privatized media description by inserting the user identification parameter of the request into each of the media element references in the media description, as further defined in the examples of FIG. 4 or FIG. 5 depending on the streaming protocol. As a consequence, the Client Device will use the privatized media description to generate requests for privatized media elements.

In one embodiment, upon reception of an identified media element request from a Client Device 150, the Media Object Allocator 330 fetches the requested media element from one selected replica among all the replicas available in Ephemeral Replica Storage 180, before forwarding it to the client device. In one embodiment, the Media Object Allocator 330 associates the request to an event and fetches the requested media element from one selected replica among all the replicas for the event. In one embodiment, the selection of one replica among all the replicas for the event is a stateless function that only depends on the identified request and the number of available replicas for the event, as provided by the Discovery Daemon 320. In one embodiment of the invention, Media Object Allocator 330 includes a deterministic function that selects a replica p among a set of P replicas, by calculating the P modulus of the media element URL request hash absolute value. In one embodiment of the invention, the Media Object Allocator 330 generates the URL of the media element in storage 180 by concatenating the selected replica identifier with the file name of the media element request without the unique user identification. In one embodiment, the media description privatizer 310 can use a deterministic rule or function based on data within the identified client device request to privatize each media element reference in a generic media description, and the media object allocator 330 can use the deterministic rule or function to convert identified media element references from the privatized media description back into a media element reference in the generic media description. The deterministic rule or function can be used by both the privatizer 310 and the allocator 330 in a predetermined way (e.g., as shown in FIG. 4, the insertion of a USERID string by the privatizer 310 and the removal of the USERID string by the allocator 330) so that both can function independently of each other and their functions can be spread across multiple different nodes in a cluster of nodes in a COS like distributed system, such as the system described in U.S. Pat. No. 9,819,972. Other embodiments may use other methods for operating privatizer 310 and allocator 330, such as mapping tables, etc.

In one embodiment, in the background, Content Management System 160 causes the launching of one or more Replicator 170 instances to maintain an appropriate level of event representation replicas in the Ephemeral Replicas Storage in relation with the business requirements. In one embodiment, the Compliance Web Service 345 of PME 140 provides upon request compliance snapshot responses, which can be used by Content Management System 160 to dynamically adjust the number of replicas. In another embodiment, Content Management System 160 receives a Replication Forecast input in anticipation of future demand of unique copies.

In one embodiment, the Content Management System 160 can set a replication level such that the total number of copies (in the Ephemeral Replica Storage) of an event is the same as the number of identified Client Device requests for the event. In one embodiment, the Content Management System 160 can set a replication level such that the total number of copies (in the Ephemeral Replica Storage) of an event is less than the total number of identified requests for the event. For example, if 1,000 Client Device requests address media elements from the first half of an event, while at the same time another 1,000 Client Device requests address media elements from the second half of the same event, a 1,000 event replicas can satisfy 2,000 identified requests.

In one embodiment, the Content Management System 160 can set a replication level based on concurrent requests occurring within a defined time interval. In one embodiment, the replication level varies over time according to compliance requirements. In one embodiment, the Content Management System determines the replication level by computing event requests based on unique user requests.

In one embodiment, Replicator 170 instances generate multiple copies of event representations recorded in Database Storage 131 by reading original media from the origin 130 and copying the files onto the File System Storage 181 of storage 180. In one embodiment of the invention, the copies have an expiration date or time-to-live value that is set upon write. In another embodiment, Replicator 170 is instructed by manager 160 to delete a list of obsolete copies.

In one embodiment, the Replica Web Service 346 of PME 140 provides an interface for a replicator 170 instance to register new replicas that have been created and unregister existing replicas that have been deleted. In another embodiment, the registration of a new replica has an optional expiration date, which allows web service 342 to obsolete the replica reference when the replica itself expires from storage 180. A reference for all current replicas for all events is stored in table 221.

In one embodiment, upon a failure to acquire the replica element, allocator 330 fetches the same element from the original copy in origin 130 and returns this element instead.

In one embodiment the allocator 330 allocates a portion of the media element requests directly to the original copy of origin 130 and returns the original media element instead of a unique replica. In one embodiment, partial original allocation is performed to protect the PME against an overwhelming surge of demand. In another embodiment, partial original allocation is performed to achieve a predetermined or other desired level of compliance.

In one embodiment of the invention, allocator 330 logs each transaction into Compliance Monitor Daemon 340, which is responsible for computing and recording a compliance summary for PME 140, for each compliance interval. In one embodiment, the compliance summary includes per each event representation, but is not limited to, the number of the current replicas, the number of client devices that have at least requested one privatized media element during the compliance interval, the peak number of client devices that have requested a uniquely named media elements containing the same content, the total number of privatized media element requests, the total number of these requests that have been over-allocated, and the total number of those requests that have fallen back to the original media element of origin 130.

In another embodiment, the over-allocation count consists of the number of media element requests that exceed the number of available replicas for the representation of that media element, aggregated on a per media element basis.

Compliance Web Service 345 is responsible for aggregating in a multi-server implementation of PME 140, the compliance summaries of each active server, before returning a system-wide compliance response.

In one embodiment, the Content Management System utilizes past compliance data for a periodic event to set an optimal replication level for a future instance of that event. In one embodiment, the Content Management System sets the desired replication level for an event to be as close as possible but not exceeding a desired compliance level such as 99.9% or 99.99%. In one embodiment the Content Management System sets the desired replication level for an event to be as low as possible but not less than a desired compliance level such as 99.9% or 99.99%.

FIG. 4 shows an exemplary embodiment of a privatized DASH manifest 401, where a USERID string that uniquely identifies the client device request, is inserted in front of the file name of the "BaseURL" element.

FIG. 5 shows an exemplary embodiment of a privatized HLS main 501 and variant 502 playlists where a USERID string that uniquely identifies the client device request, is prepended to the file name of each variant playlist URL in the main playlist and prepended to the file name of each segment URL in the variant playlist.

FIG. 6 shows an exemplary embodiment of a Replica Web Service 346 in the form of an HTTP RESTful API. Upon invocation of the 'replica' service, the 'apps' servlet either registers or unregisters, depending on the 'do' parameter, one replica for an event representation identified by the 'url' and the 'rep' parameters. In one embodiment, the replica 'id' includes an absolute path to the replica with a unique replica ID that needs to be prepended to the media element name (for example http://digital-keystone-replicator.s3-web site-us-east-1.amazonaws.com/14AMIL7ENJH810:).

FIG. 7 shows an exemplary embodiment of a Compliance Web Service 701 in the form of an HTTL RESTful API. In the example, upon invocation of the 'comply' service, the 'analytics' servlet returns a response body compliant with the XML Schema Definition of FIG. 8.

FIG. 8 shows an XML Schema Definition 801 for the response body of the exemplary embodiment of the Compliance Web Service of FIG. 7. The response covers the compliance of an event for the period of time since it first aired, divided in 'n' sample elements, where 'n' is one of the parameters of the query. Each sample covers the state of compliance for the event, identified by the attribute "(@url)". In one embodiment, the sample includes one element (clientCount) per representation (@repId) that summarizes the number of active user devices, the average number of available replicas (@avrReplica), the maximum number of available replicas (@maxReplica), the minimum number of available replicas (@minReplica), the total number of media element requests (@totalReq) from the active user devices, the number of these requests that fell back to the original media element (@redirect), the number of these requests that were over-allocated (@over) and the maximum number of active user devices that have requested uniquely named media elements containing the same content (@peak). In another embodiment, the over-allocation corresponds to the sum for each media element of the representation of the count of requests beyond the number of replicas.

Figure 9:
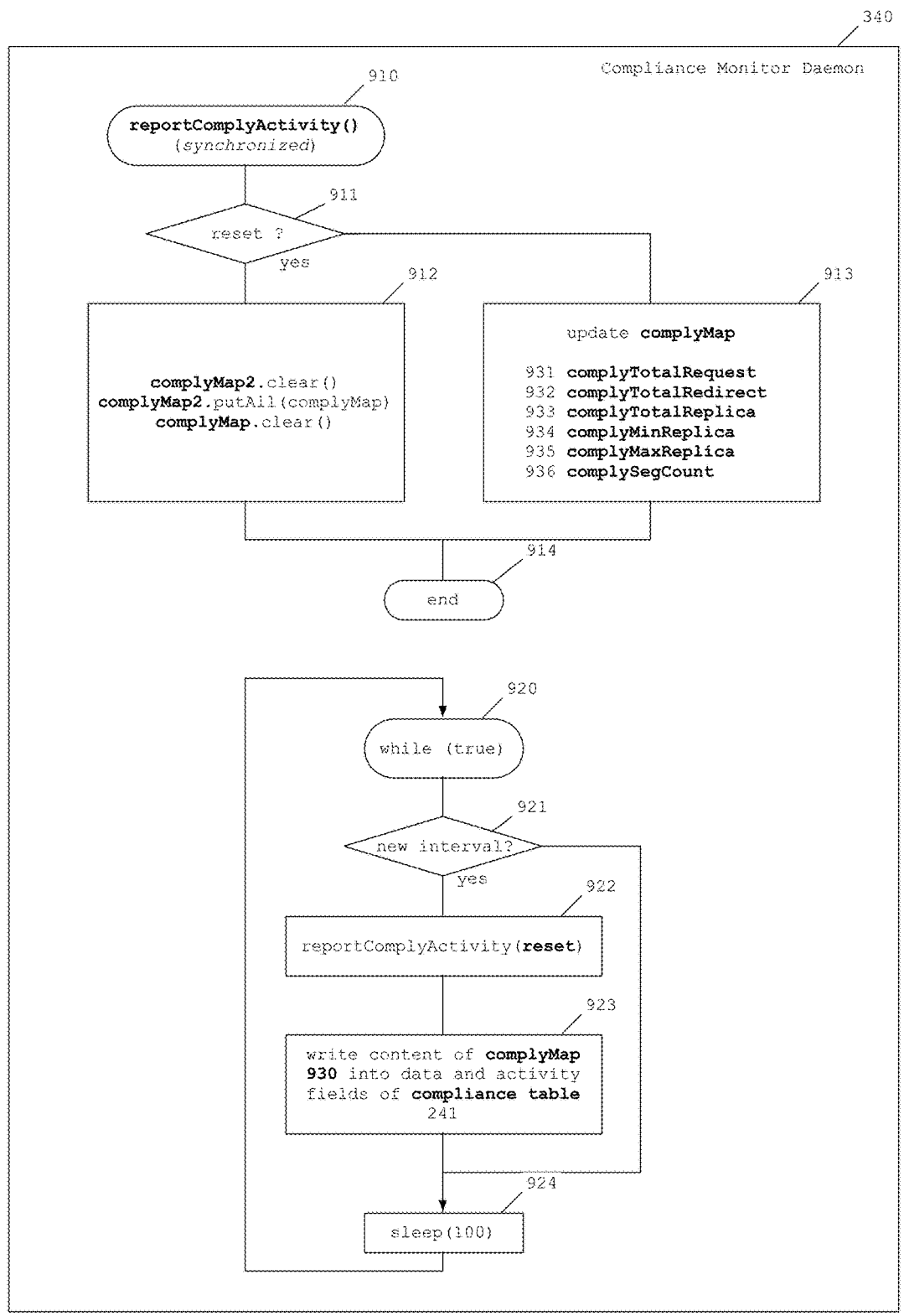
FIG. 9 shows a state diagram describing the main operation of an exemplary embodiment of a Compliance Monitor Daemon 340.

FIG. 9 shows a state diagram describing the main operation of an exemplary embodiment of a Compliance Monitor Daemon 340. Diagram 900 consists of a reportComplyActivity 910 synchronized method, which can only be called by one thread at a time, and an infinite loop 920 to periodically write what has been aggregated into the database during the compliance interval. In one embodiment, method 910 has two modes of operation; it is called by the servlet that is responsible for delivering the media element responses each time a media element transaction has been privatized (not shown in FIG. 9) and it is called by the infinite loop once per sampling interval to freeze and reset the global variables (operation 922).

In one embodiment, operation update complyMap 913 adds the new record information into a set of collection objects (complyMap) for the defined event representation. In one embodiment, complyMap 930 consists of six different collection objects indexed per event and per event representation. One collection objects 931 aggregates a count of the identified media request, another object 932 aggregates a count of the identified media requests that were redirected to the COS, three objects 933, 934 and 935 respectively keep count of the minimum count/average count/maximum count of available replicas, and another object 936 keeps a HashMap, where the key is the hash of the media element URL, stripped of the client identification, and the value is a HashSet of all the client identifications that have requested the media element.

In another embodiment, when a requested media element is found to be part of more than one event (i.e. nested event or overlapping event), the method 910 is only called for the event of the selected replica.

In case of a reset operation, operation 912 of method 910 consists of first clearing the content of the copy of the collection objects (complyMap2), which is used for reporting, transferring the content of primary objects (complyMap) into the object copies (complyMap2) and resetting the primary objects (complyMap) to start aggregating transactions for the next compliance interval.

Infinite loop 920 will, for every compliance interval, call method 910 in reset mode (operation 922) to prepare the data to be reported and it will write the content of the copied collection objects of complyMap 930 in an activity field and a data field of the Compliance Table 241 (operation 923). In one embodiment, the activity field includes the requests and replicas information, in another embodiment, the data field includes the base64 encoded map of the segment count HashMap. In one embodiment, the entry is keyed by the eventUrl to group on one row all the data required by the Compliance Web Service 345, described in FIG. 3.

Figure 10:
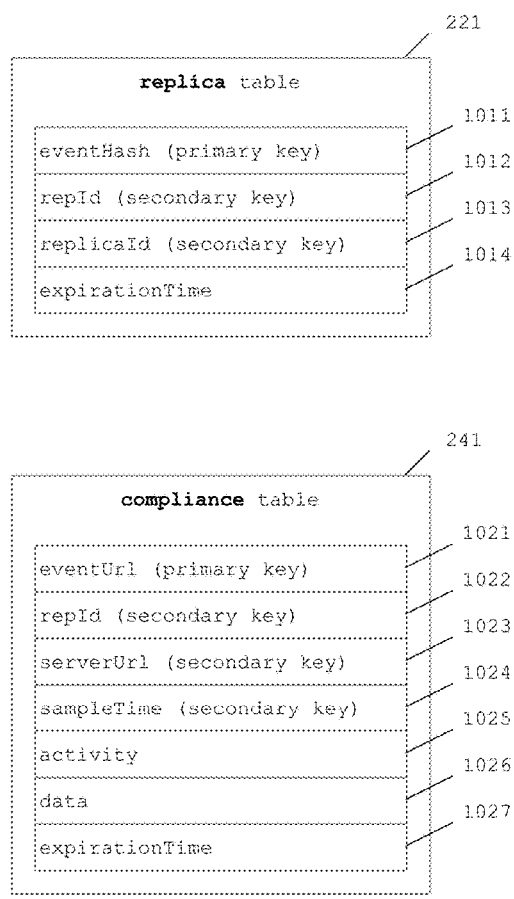
FIG. 10 shows the schema of two database tables that respectively store an exemplary embodiment of the replica details and of the compliance analytics.

FIG. 10 shows the schema of two database tables that store respectively an exemplary embodiment of the Replica Table 221, and the Compliance Table 241, both introduced in FIG. 2.

In one embodiment, table 221 consists of a primary key set to the hash of the event URL 1011, as entered in the system through the replica service 601 parameter 'url', a first secondary key set to the representation identifier 1012, as entered in the system through the replica service 601 parameter 'rep' and another secondary key that uniquely identifies the replica identifier 1013, as entered in the system through the replica service 601 parameter 'id', and the expiration time of the record 1014, as entered in the system through the replica service 601 parameter 'exp'. In one embodiment, each record has an associated ttl (not shown in FIG. 10) calculated upon write based on the difference between the expiration time and the record time in seconds.

In one embodiment, table 241 consists of a primary key set to the eventUrl 1021 for the purpose of grouping on the same row, all records that would be queried together by the Compliance Web Service 345, a secondary key that represents the media element representation 1022, another secondary key to differentiate the entry per processing server 1023, another secondary key that represents the sample time 1024, activity field 1025, the data field 1026, and the expirationTime field 1027 of the event for the purpose of setting a similar time to live for the compliance as for the event itself.

Figure 11:
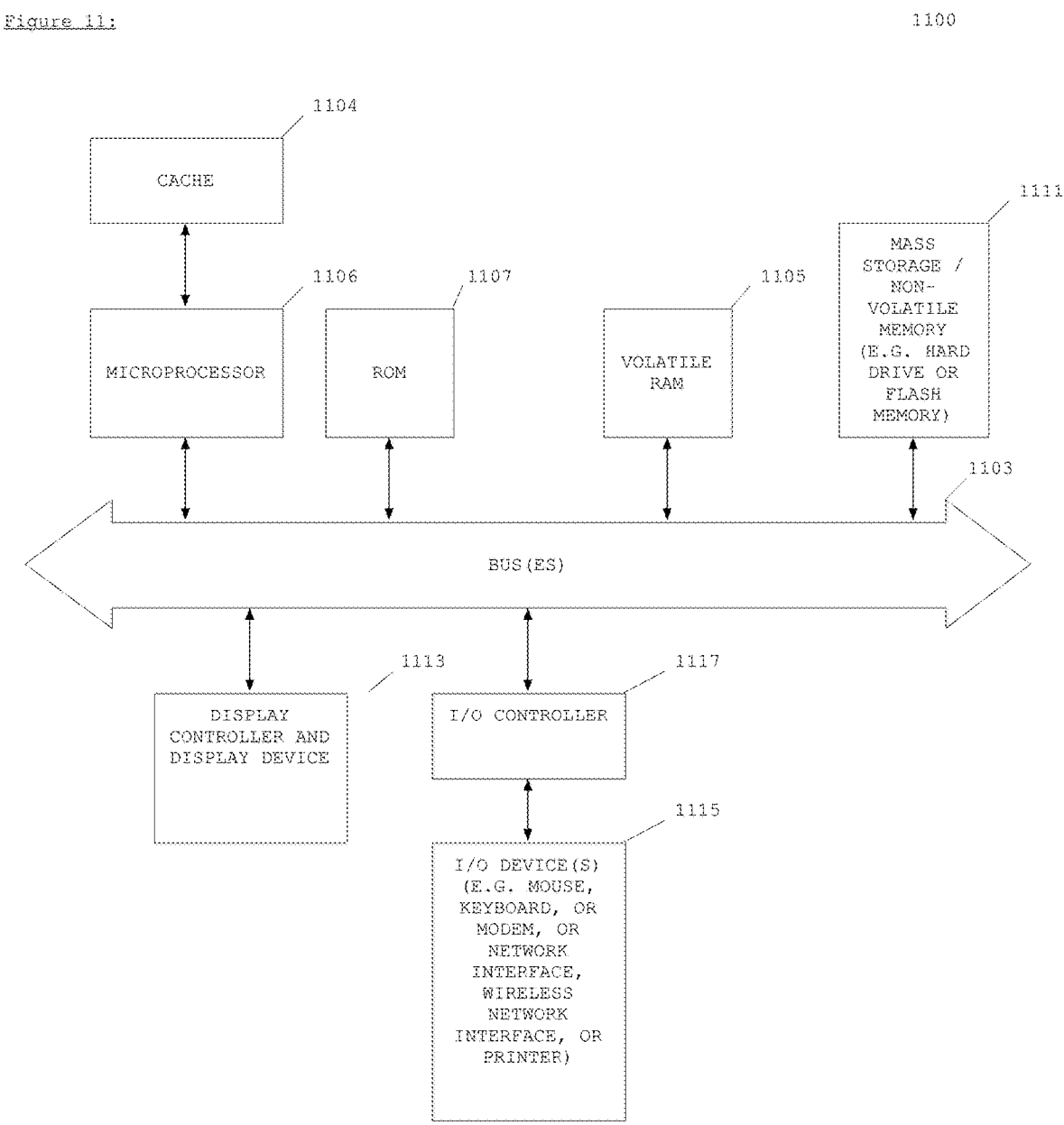
FIG. 11 shows an example of a data processing system that can be used to implement one or more Private Media Engines; in one embodiment, a server farm can include a plurality of the systems shown in FIG. 11 to provide one or more Private Media Engines.

FIG. 11 shows one example of a data processing system, which may be used as any one of the nodes in any one of the embodiments described herein. Note that while FIG. 11 illustrates various components of a data processing system, it is not intended to represent any particular architecture or manner of interconnecting the components as such details are not germane to this description. It will also be appreciated that other data processing systems which have fewer components or perhaps more components than those shown in FIG. 11 may also be used with one or more embodiments described herein.

As shown in FIG. 11, the system 1100, which is a form of a data processing system, includes one or more buses 1103 which is coupled to one or more microprocessor(s) 1106 and a ROM (Read Only Memory) 1107 and volatile RAM 1105 and a non-volatile memory 1111. The one or more processors can be coupled to optional cache 1104. The one or more microprocessors 1106 may retrieve the stored instructions from one or more of the memories 1107, 1105 and 1111 and execute the instructions to perform operations described above. These memories represent examples of machine readable non-transitory storage media that can store or contain computer program instructions which when executed cause a data processing system to perform the one or more methods described herein thereby causing the system 1100 to operate like any one of the PME(s) described herein. The bus 1103 interconnects these various components together and also interconnects these components 1106, 1107, 1105 and 1111 to an optional display controller and display device 1113 and to optional peripheral devices such as input/output (I/O) devices 1115 which may be one or more of mice, touch screens, touch pads, touch sensitive input devices, keyboards, modems, network interfaces, printers and other devices which are well known in the art. Typically, the input/output devices 1115 are coupled to the system through input/output controllers 1117. The volatile RAM (Random Access Memory) 1105 is typically implemented as dynamic RAM (DRAM), which requires power continually in order to refresh or maintain the data in the memory.

The mass storage 1111 is typically a magnetic hard drive or a flash memory or other types of memory system (or a combination of systems) which maintain data (e.g., large amounts of data) even after power is removed from the system. Typically, the mass storage 1111 will also be a random-access memory although this is not required. The mass storage 1111 can be used to provide storage for the database 131. The mass storage 1111 can thus be used to store the request profiles for the media element files and their metadata. While FIG. 11 shows that the mass storage 1111 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

What is claimed is:

1. A method for delivering private media, the method comprising:
   privatizing media descriptions per identified client device request, where the privatizing comprises dynamically editing a generic media description with media element references that are identified per client device request to create a privatized media description for each identified client device request;
   discovering repeatedly over time the number of representation replicas made available on an ephemeral replicas storage system;
   allocating for each request of identified media elements, in the privatized media description a media element from one of the discovered representation replicas;
   monitoring the available replicas and the media element requests.

2. The method of claim 1, where the identified client device request is identified by one or more user identifying parameters.

3. The method of claim 1, where the privatizing is accelerated by caching the generic media description for further requests for playback of an event represented by the generic media description.

4. The method of claim 1, where the privatizing generates identified media references only under certain conditions.

5. The method of claim 4, where the system conditions that allow for privatizing depend on the incoming request traffic.

6. The method of claim 4, where the privatization is decimated not to exceed a configurable maximum number of unique client device connections.

7. The method of claim 1, where each event representation replica is uniquely identified and located by using a single event replica identifier.

8. The method of claim 1, where the discovering process is a map and reduce micro batch operation that repeats periodically.

9. The method of claim 8, where the period of the discovering corresponds to a compliance interval.

10. The method of claim 1, where the allocating is a deterministic operation mapping each request to a single replica among a pool of available replicas.

11. The method of claim 1, where the allocating for successive media element requests of an event for a specific client device are distributed over one or more event replicas among a pool of available replicas.

12. The method of claim 1, where the allocating for requests of media elements that are referenced by two or more overlapping events is made from a pool of the combined available replicas for all the overlapping events.

13. The method of claim 1, where the allocating falls back to a common media element, upon failure to retrieve an available media element replica.

14. The method of claim 1, where the allocating falls back to a common media element for a portion of the transactions.

15. The method of claim 14, where the fall back is triggered upon detection of an overwhelming surge of requests.

16. The method of claim 14, where the fall back is triggered upon a pre-determined compliance monitoring result.

17. The method of claim 1, where the monitoring includes for each compliance interval, one or more of the followings:
   a. The number of unique media requests per event representation;
   b. The average, minimum and maximum number of replicas that were made available per event representation;
   c. The peak number of unique requests for media elements containing the same content;
   d. The total number of allocating transactions per event representation;
   e. The total number of over-allocated transaction per event representation; or
   f. The total number of transactions per event representation that have fallen back to a common media delivery.

18. The method of claim 17, where the allocating count is aggregated on a per media element basis.

19. The method of claim 17, where the allocating for requests of media element that are referenced by two or more overlapping events is only counted against the event that references the allocated replica.

20. The method of claim 1, where the monitoring is made available to a content management system.

21. The method of claim 20, where the content management system increases or decreases the number of ephemeral event representation replicas based on the monitoring of the available number of replicas and the peak number of unique client devices that have requested uniquely named media elements containing the same content.

22. The method of claim 20, where the content management system determines the actual replication compliance for an event, based on the monitoring of the total number of allocating transactions, the total number of over-allocated transaction and the total number of transactions per event representation that have fallen back to a common media delivery.

23. The method of claim 20, where the content management system predetermines before an event is being requested the optimal number of replicas, based on a desired compliance level and on past monitoring information.

24. The methods of claim 23, where the predetermination is performed using artificial intelligence and/or machine learning methods and techniques.

25. A non-transitory machine-readable media storing executable program instructions which when executed by one or more data processing systems cause the one or more data processing systems to perform a method for delivering private media, the method comprising:

privatizing media descriptions per identified client device request, where the privatizing comprises dynamically editing a generic media description with media element references that are identified per client device request to create a privatized media description for each identified client device request;

discovering repeatedly over time the number of representation replicas made available on an ephemeral replicas storage system;

allocating for each request of identified media elements in the privatized media description, a media element from one of the discovered representation replicas;

monitoring the available replicas and the media element requests.

26. The method of claim 25, where the identified client device request is identified by one or more user identifying parameters, wherein the generic media description is a playlist or manifest for an event, and wherein the privatizing generates identified media element references per identified client device request.

27. The media of claim 25, where the privatizing is accelerated by caching the generic media description for further requests from other client devices for playback of the event represented by the generic media description.

28. The media of claim 25, where the privatizing generates unique media references only under certain conditions.

29. The media of claim 28, where the system conditions that allow for privatizing depend on the incoming request traffic.

30. The media of claim 25, where the event representation replicas are uniquely identified and located by using a single event replica identifier.

31. The media of claim 25, where the discovering process is a map and reduce micro batch operation that repeats periodically.

32. The media of claim 25 wherein the privatizing uses a deterministic rule or function based on data within the identified client device request, and the allocating uses the deterministic rule or function to convert identified media element references from the privatized media description back into a media element reference in the generic media description.

* * * * *